Oct. 20, 1942.                C. A. BICKEL                2,299,677
                       TAPER ATTACHMENT CONSTRUCTION
                          Filed June 10, 1940        5 Sheets-Sheet 1

INVENTOR
CLIFFORD A. BICKEL
BY
ATTORNEYS

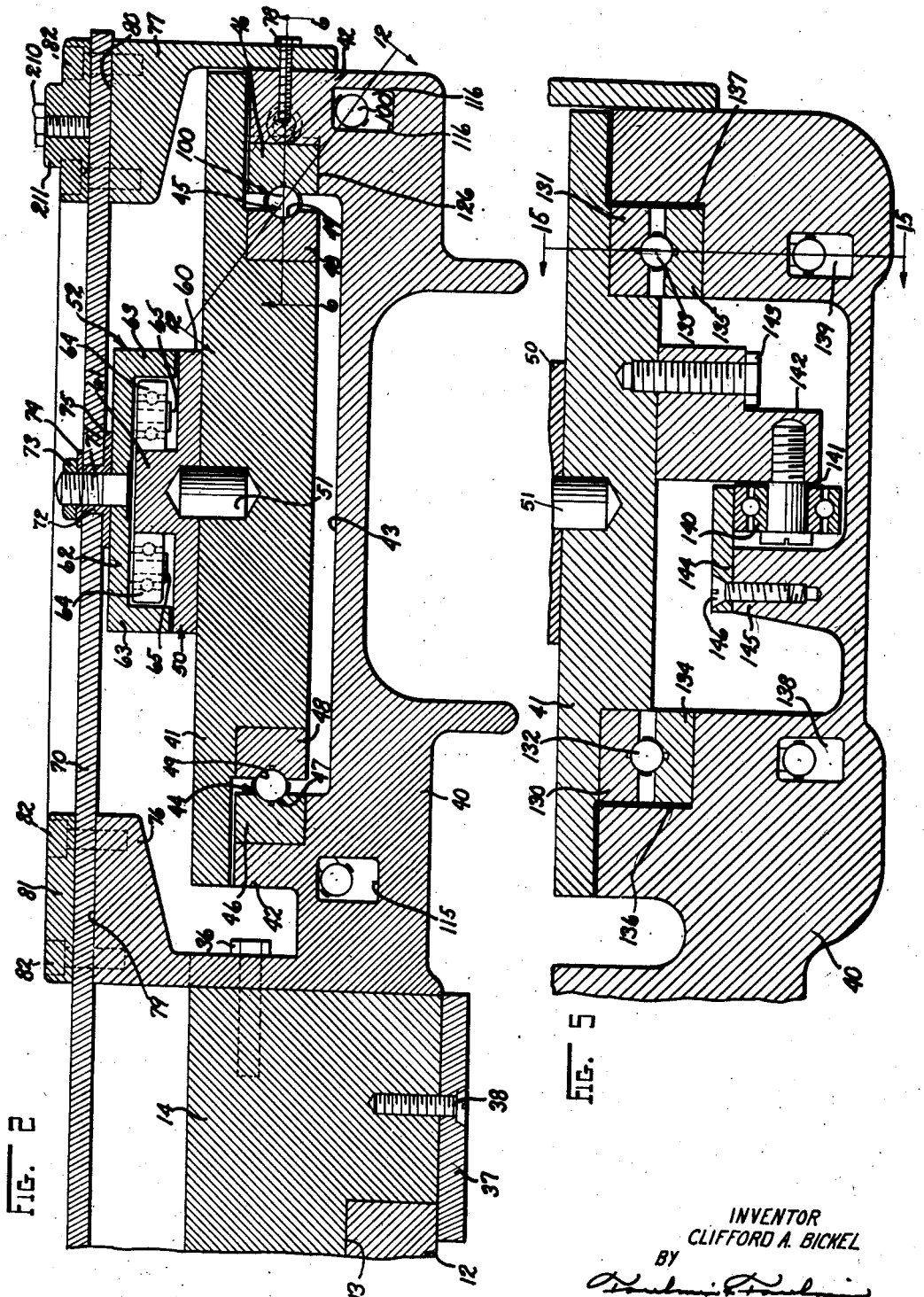

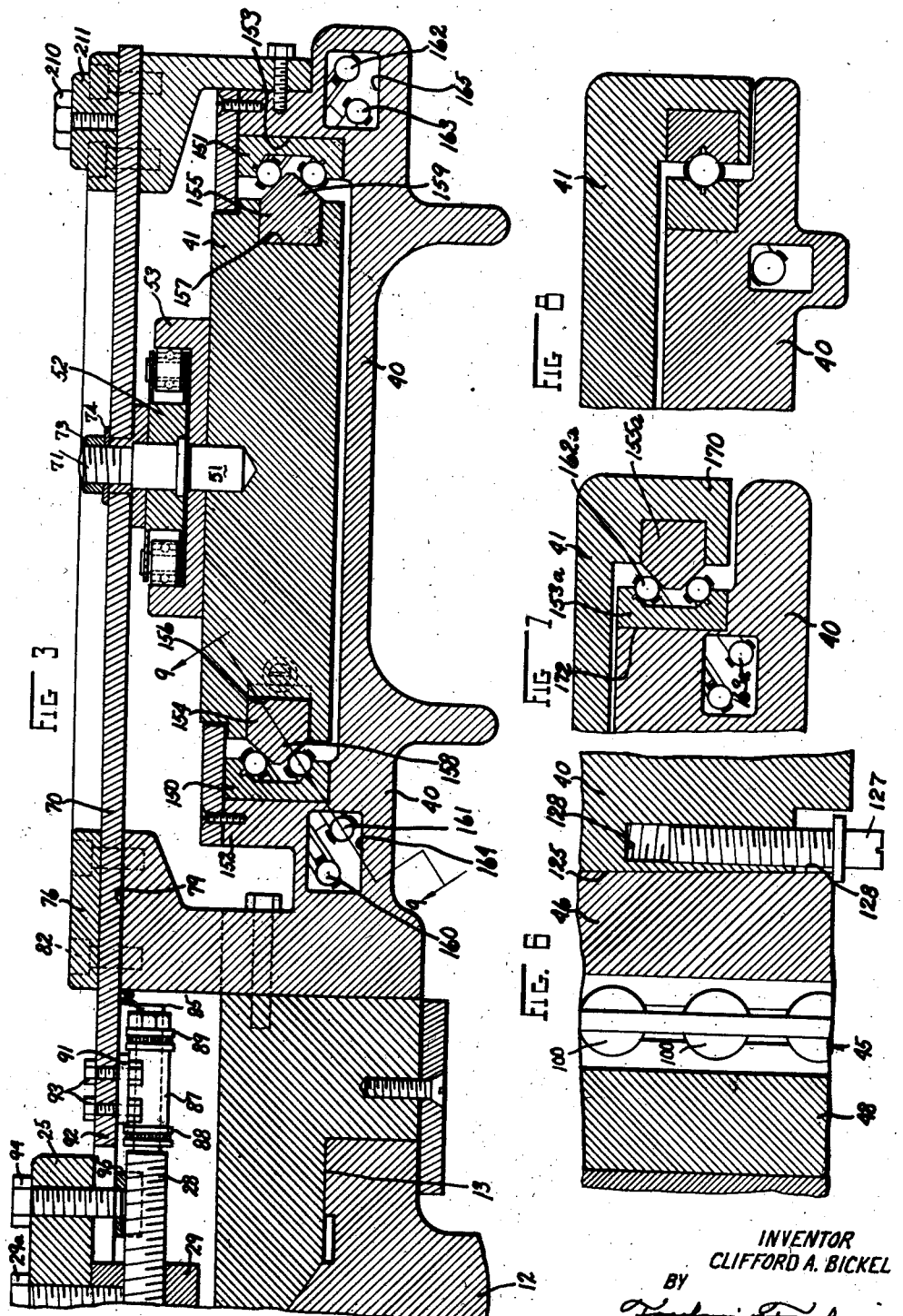

Oct. 20, 1942.  C. A. BICKEL  2,299,677
TAPER ATTACHMENT CONSTRUCTION
Filed June 10, 1940  5 Sheets-Sheet 4
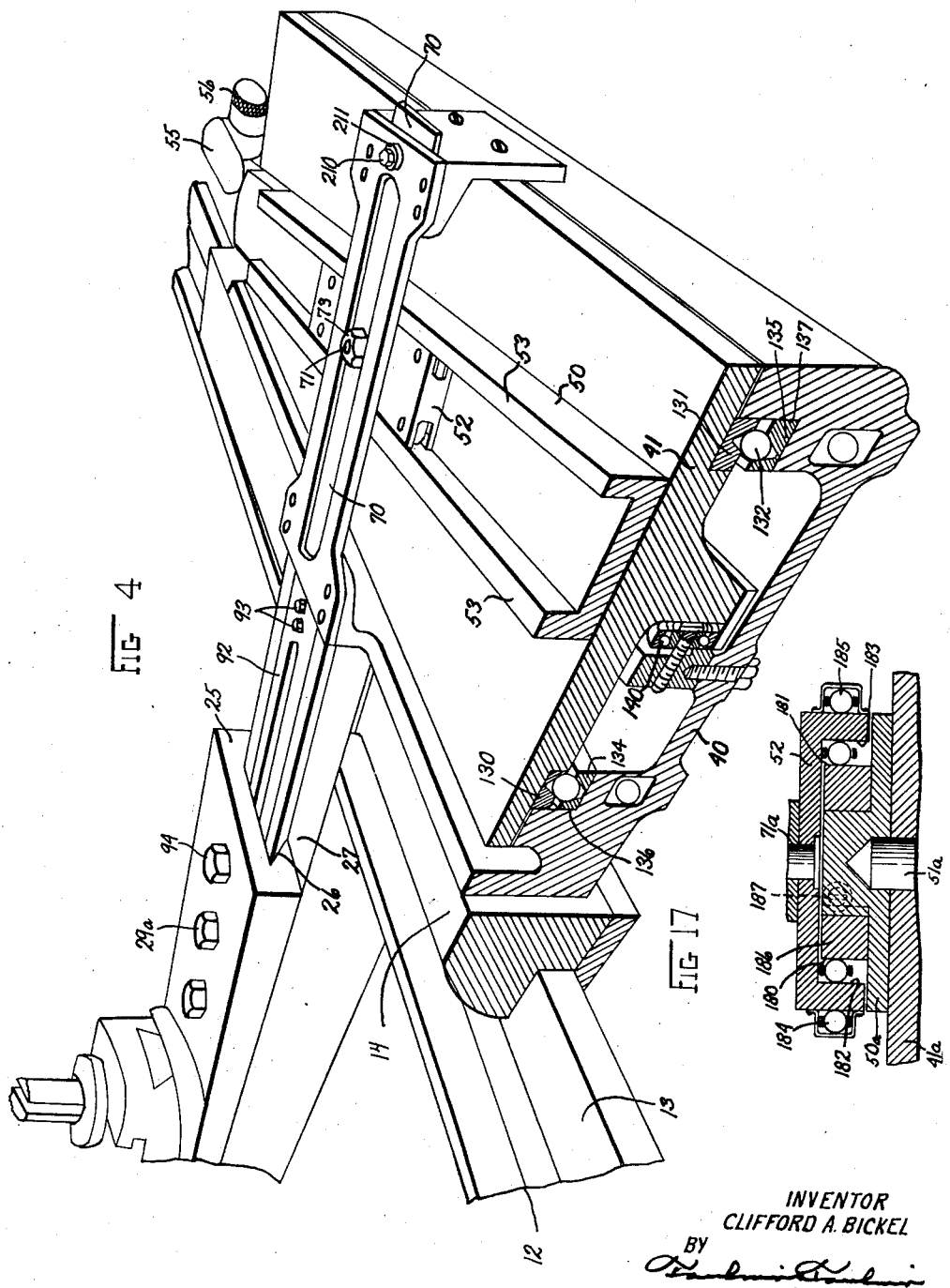
INVENTOR
CLIFFORD A. BICKEL
BY
ATTORNEYS Oct. 20, 1942.    C. A. BICKEL    2,299,677
TAPER ATTACHMENT CONSTRUCTION
Filed June 10, 1940    5 Sheets-Sheet 5
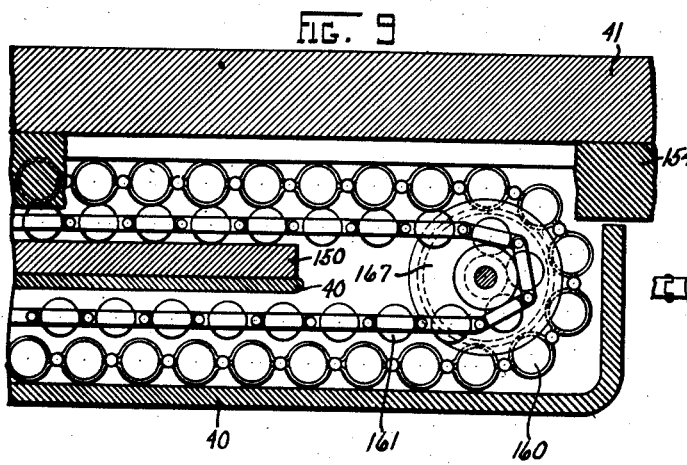
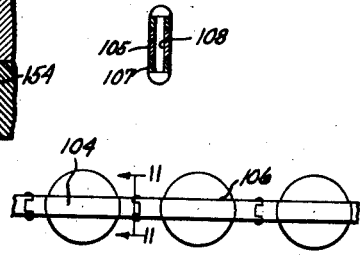
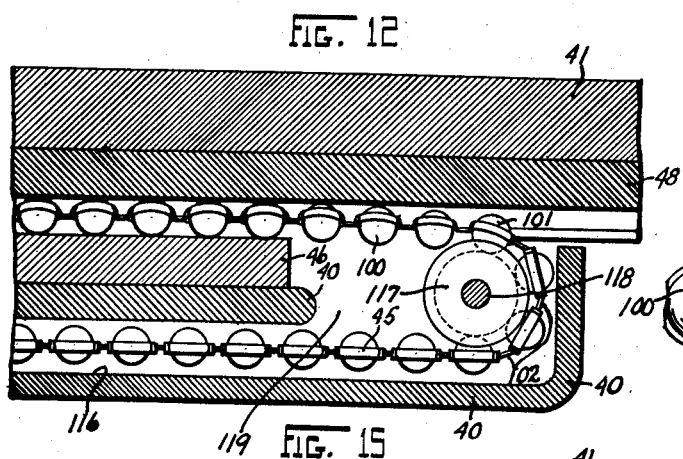
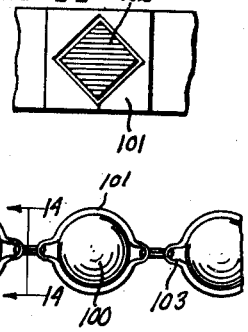
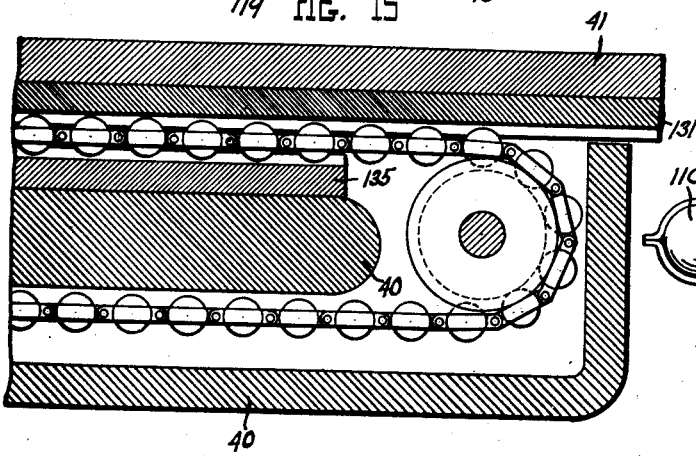
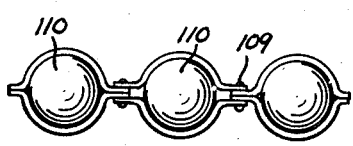
INVENTOR
CLIFFORD A. BICKEL
BY
ATTORNEYS Patented Oct. 20, 1942

2,299,677

UNITED STATES PATENT OFFICE 2,299,677

TAPER ATTACHMENT CONSTRUCTION

Clifford A. Bickel, Sidney, Ohio, assignor to The Monarch Machine Tool Co., Sidney, Ohio, a corporation of Ohio Application June 10, 1940, Serial No. 339,684

26 Claims. (Cl. 82—17)

This invention relates to turning apparatus and particularly to lathes for turning tapers on articles simultaneously with longitudinal movement of a turning tool.

An object of this invention is to provide a device which can be used in connection with a lathe whereby a taper on a turned article may be produced simultaneously with longitudinal movement with the carriage of a lathe, and wherein the transverse thrust occasioned by the angular movement of the taper turning apparatus will be assumed by a plurality of anti-friction bearing surfaces positioned between the movable guided surfaces of the taper turning apparatus in order to produce, as near as possible, a frictionless operating device.

A further object of this invention is to provide a taper turning apparatus wherein the movable or slidable portions thereof may have a greater travel than has heretofore been possible without the adjacent movable edges leaving an anti-friction bearing surface.

Another object of this invention is to provide a taper turning apparatus wherein a multiplicity of small anti-friction bearing devices are interposed between the movable surfaces of the taper turning apparatus to reduce to a minimum the amount of bearing surface.

Another object of this invention is to provide a taper turning apparatus wherein a slide member is guided in suitable channels in a carriage member, and wherein a plurality of rotary anti-friction bearing elements are interposed to reduce operating friction between these members.

A further object of my invention is to provide a taper turning device wherein a multiplicity of anti-friction bearing devices are lineally interconnected to provide a continuous chain of small bearing surfaces which may be interposed between the movable elements of the taper turning device.

Another object of this invention is to provide a construction in a taper turning device wherein anti-friction bearing elements are interposed between the movable members of the device, the structure being such that the thrust imposed upon the bearing surfaces may be directed inwardly or outwardly against the surfaces according to the specific structural arrangement.

Another object of this invention is to provide a taper turning device wherein a slide member is guided upon a carriage member, and wherein a continuous chain of lineally interconnected rotary bearing elements are interposed between the slide and the carriage and means are provided to tension the chain longitudinally, either vertically with respect to the guide members or angularly therefrom.

Another object of this invention is to provide a taper turning device wherein a slide member is guided upon a carriage member by means of a plurality of interconnected anti-friction bearing elements, and wherein the plurality of bearing elements prevent vertical displacement of the slide from the carriage.

Further objects and advantages will be apparent from the description and the drawings which follow.

In the drawings:

Figure 2 is a transverse cross-sectional view of the taper turning device;

Figure 3 is a view similar to Figure 2 showing another form of bearing mounting for the taper turning device and including the operative interconnection with the cross-slide of the lathe;

Figure 4 is a perspective view partially in cross-section showing a portion of the lathe and the taper turning attachment showing a modified bearing structure and follower shoe arrangement;

Figure 5 is a transverse cross-sectional view of the taper turning device similar to Figure 2 showing a modified arrangement of the bearing structure as disclosed in Figure 4;

Figure 6 is a partial sectional view taken along line 6—6 of Figure 2;

Figure 7 is a cross-sectional view of the guideway portion between the slide and carriage of the taper turning device showing a modified arrangement of the bearing assembly disclosed in Figure 3;

Figure 8 is a cross-sectional view of the guideway portion between the slide and the carriage showing a modified bearing arrangement from that disclosed in Figure 2;

Figure 9 is a partial cross-sectional view taken along line 9—9 of Figure 3 and having certain portions thereof broken away to clarify other portions;

Figure 10 is an enlarged elevational view of one of the lineally interconnected antifriction chains used in Figure 9;

Figure 11 is a further enlarged section taken along line 11—11 of Figure 10 to show the interconnecting link;

Figure 12 is a partial cross-sectional view taken along line 12—12 of Figure 2;

Figure 13 is an enlarged elevational view of a portion of the anti-friction chain used in Figure 12;

Figure 14 is a cross-sectional view taken along line 14—14 of Figure 13 to show the interconnecting link between adjacent anti-friction bearing members;

Figure 15 is a partial cross-sectional view taken along line 15—15 of Figure 5;

Figure 16 is an enlarged elevational view of the anti-friction chain shown in Figure 15;

Figure 17 is a transverse cross-sectional view of the shoe and swivel member and shows a continuous lineally interconnected chain of anti-friction bearing members applied for use between the movable surfaces thereof.

General construction

Figure 1:
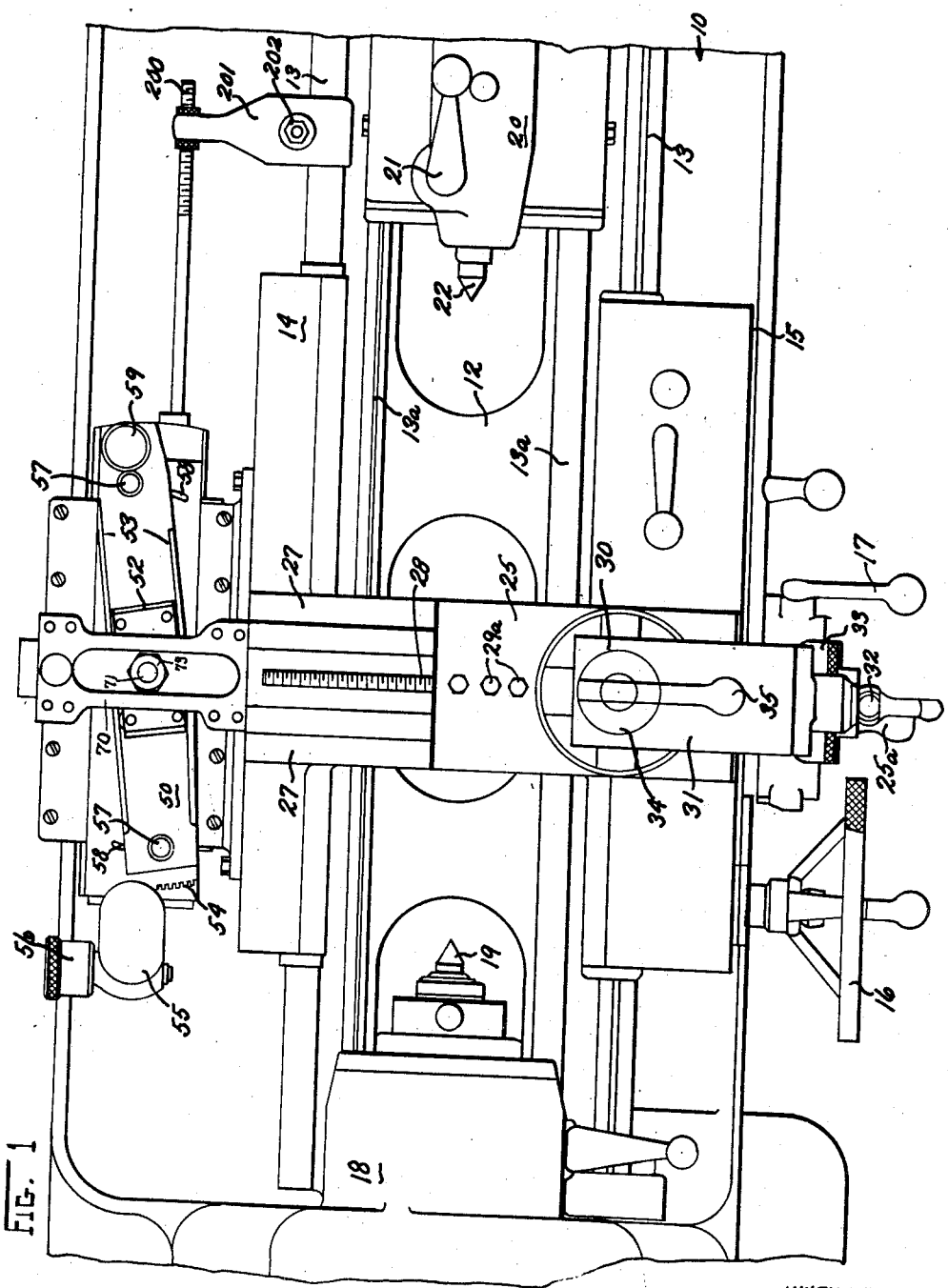
Figure 1 is a plan view of a lathe with the taper turning device of my invention attached thereto.

In general, the taper turning apparatus of this invention consists of a guideway or swivel which may be adapted by suitable means, for use in combination with a lathe or any other machine tool turning apparatus. This swivel is provided with a follower or shoe which engages a guideway in the swivel in such a manner that movement of the shoe in the guideway, when the guideway is arranged angularly with respect to the axis of rotation of the turning apparatus, will transmit, through a suitable member, an angular motion with respect to the axis of rotation of the turning machine. As this follower or shoe member moves to and fro in the swivel the motion transmitted through the transmitting member will cause a tool, positioned upon the lathe and interconnected with the transmitting member, to move transversely with respect to a workpiece in the lathe while moving longitudinally, thereby cutting a taper upon the workpiece. In this manner the cutting tool follows the same angular position of the swivel.

The swivel is pivotally mounted upon a slide member which is held stationarily with respect to the lathe bed. This slide member is in turn positioned upon a carriage bracket which is mounted upon the carriage member of the lathe. As the carriage member of the lathe moves to and fro along the ways of the lathe bed the carriage bracket will be moved longitudinally with respect to the slide member. Since the follower or shoe is interconnected with the tool positioned upon the carriage of the lathe, and with the carriage bracket of the taper turning device, it will be seen that relative movement between the slide and swivel with respect to the carriage bracket, carriage and shoe will produce the aforementioned taper cutting function of the tool carried upon the lathe carriage.

Since the carriage bracket and slide have relative longitudinal movement parallel with the axis of rotation of the turning machine, it may be seen that when the swivel is positioned angularly with respect to the axis of rotation of the turning machine that considerable transverse thrust will be imposed upon the sliding bearing surfaces between the shoe and swivel and between the slide and carriage bracket. Between these surfaces anti-friction bearing devices have been interposed consisting of a multiplicity of individually positioned, but lineally interconnected rotary bearing members to reduce to a minimum the amount of friction created between the various sliding members. As the angle of the angular displacement of the swivel is increased with respect to the axis of rotation of the turning machine, the transverse thrust increases very rapidly so that it is desirable to reduce to a minimum the bearing surfaces and the ease with which the bearings may be rotated, which improved function may be produced by the novel bearing arrangement of this invention.

According to this invention, the bearing arrangement not only reduces the degree of friction between adjacent slidable surfaces but also permits greater longitudinal movement of the slide with respect to the carriage without advancing the slide beyond a frictionless bearing point.

Lathe construction

The apparatus of the present invention consists of a lathe 10 having a bed 12 upon which are positioned longitudinally disposed ways 13. A lathe carriage 14 is positioned upon the ways 13 and is adapted to be carried to and fro by suitable lathe operating mechanism. The carriage 14 is provided with a vertically disposed apron 15 depending vertically from the carriage 14 at the front side of the lathe. The control devices are mounted upon this apron and consist of a manually operable hand wheel 16 which is adapted to engage the feed rack (not shown) of the lathe in order to move the carriage 14 along the ways 13 of the lathe. A clutch operating lever 17 is also mounted upon the apron 15 and is provided for controlling the starting and stopping movement of the carriage 14.

Disposed at one end of the lathe bed 10 is a head stock 18 within which there is provided suitable mechanism for driving a live spindle 19. At the opposite end of the lathe and positioned upon the lathe bed 10 there is disposed a tail stock 20 which may be moved to and fro along the ways 13a of the lathe and is provided with a clamping lever (not shown) for retaining the tail stock in any position along the ways 13a and clamping the same thereto, to position a workpiece (not shown) between the live spindle 19 and the dead center 22 in the tail stock 20. The lever 21 locks the spindle and dead center 22 in position in the tail stock.

There is positioned upon the carriage 14 a cross-slide 25. This cross-slide 25 is provided with a dovetail, Figure 4, which guides the transverse movement of the cross-slide upon the horizontal way 27. The cross-slide 25 is adapted to be moved to and fro transversely upon the way 27 by means of a cross-feed screw 28 which is connected by suitable gearing mechanism to the feed rod (not shown) in order to provide a machine driven cross-slide 25. The cross-slide 25 may be operated manually by means of rotatable arm 25a. A compound tool slide 30 of conventional structure is mounted upon the cross-slide 25. The compound tool slide comprises the usual guide member 31 which is moved relative to the cross-slide by means of the manually operatable and rotatable balance wheel 32. The usual micrometer head 33 for indicating the movement of the cross-slide and compound tool slide is provided upon suitable mountings upon the cross-slide 25. A tool post 34 extends vertically from the compound tool slide and is provided with the usual slot in which a working tool may be positioned. In order to rigidly secure the tool in position within the tool post a tool and tool post clamping means 35 is provided upon the top portion of the tool post 34. This clamping means may be of the usual cam acting construction for quickly securing the tool and tool post rigidly to the compound tool slide.

The cross-feed screw 28 threadedly engages a cross-feed nut 29 mounted upon the cross-slide 25. The cross-feed nut 29 is secured to the cross-slide 25 by means of the bolts 29a. Rotation of the cross-feed screw 28, either manually or automatically through the lathe driving mechanism, within the cross-feed nut 29 will cause the cross-slide 25 to be reciprocated transversely of the lathe. This cross-feed screw 28 is provided with a conventional sliding telescopic connection with the cross-feed operating means. A particular telescopic arrangement of the cross-feed rod 28 with the lathe driving mechanism, to permit transverse movement of the cross-slide 25 without rotation of the cross-feed screw 28, is more completely disclosed and described in the patent to C. A. Bickel, No. 2,184,377, issued December 26, 1939. The function and the reason for this telescopic arrangement will be hereinafter described.

*Taper cutting device*

The taper cutting device shown in Figures 1, 2 and 4 consists of a carriage bracket 40 in which a slide member 41 is guided by means of anti-friction bearing devices hereinafter described. The carriage bracket 40 is secured to the carriage 14, positioned upon the ways 13 of the lathe, by means of the bolts 36. In order to retain the carriage 14 from vertical displacement of the ways 13 there is provided a clamping plate 37 which is screwed to the under side of the lathe carriage 14 by means of suitable screws 38. This clamping plate 37 extends under the edge of the lathe bed 12 and is in sliding engagement therewith to permit the carriage 14 to slide longitudinally upon the ways 13.

The carriage bracket 40 of the taper turning device is provided with vertically extending and longitudinally positioned guideways 42 which are in parallel relationship with respect to each other. These guideways 42 thereby provide a channel shaped recess 43 between said guideways in which the slide 41 is adapted to operate in longitudinally guided relationship with the carriage bracket 40, but is retained from longitudinal movement with respect to the lathe bed 12 by means of an anchor rod 200. This rod 200 is secured to an anchor bracket 201 which is mounted upon the way 13 of the lathe and is rigidly secured in position upon the way 13 by means of a clamping bolt 202. The clamping bolt 202 extends through and engages a clamping bracket (not shown) positioned below the bottom surface of the way 13 so as to clamp the anchor bracket to the way. This provides the means for retaining the slide stationary with respect to the lathe.

Anti-friction bearing devices 44 and 45 are positioned between each of the adjacent cooperating guiding walls of the carriage bracket 40 and slide 41. A hardened steel insert 46 is positioned in each of the vertically extending guidewalls 42 of the carriage bracket 40. These steel inserts 46 have a radial recess 47 in the ways thereof which forms one-half of the race for a rotary bearing element, of which the anti-friction bearing device 44 is composed. Similar steel inserts 48 are positioned within the slide 41 and have radially curved recesses 49 in the faces thereof which form the opposite half of a race for the rotary anti-friction bearing device of which the bearing devices 44 and 45 are composed, said bearing devices being hereinafter more fully described.

A swivel member 50 is positioned upon the upper face of the slide 41 and is pivotally mounted thereto by means of a pin 51. The swivel 50 is arranged so that it may assume an angular position with respect to the longitudinal movement between the slide 41 and the carriage bracket 40. A follower or shoe 52 is positioned upon the swivel 50 and is guided in its path of travel within the swivel 50 by means of the vertically positioned longitudinally extending guidewalls 53, see Figure 1 or Figure 4, which extend in parallel relation to each other. The swivel 50 is provided at one end thereof with a gear segment 54 which engages a micrometer adjustment device 55. The micrometer adjustment device 55 is provided with a suitable train of gears to cause minute angular movements of the swivel 50 about the pivot 51 in order to accurately position the angular position of the swivel 50 with respect to the axis of rotation of the workpiece (not shown) positioned between the live center 19 and the dead center 22 of the lathe. A manually rotatable knob 56 is provided on the micrometer adjustment device for operating the same and may be provided with a calibration around the circumference thereof to indicate the angular position of the swivel 50 in position upon the slide 41, thumb nuts 57 are provided at each end of the swivel 50. These thumb nuts 57 cooperate with a threaded bolt which extends downwardly through the swivel 50 and engages the slots 58 positioned in the top face of the slide 41 and cooperate therewith in order to securely bind the swivel 50 to the slide 41 when the thumb nuts are tightened. A scale sight 59 may be provided on one end of the swivel which may slide over indices for indicating the angle of position of the swivel.

As shown in Figure 2, the swivel 50 is slightly modified from that shown in Figures 1 and 4, and consists of a longitudinally extending member which is substantially T-shaped in cross-section. The horizontal portion 60 of the T-shaped cross-section member rests upon the upper face of the slide 41 and cooperates with the pivot pin 51. The upwardly extending vertical leg 61 of the T-shaped member provides the longitudinal guideway for the shoe 52. The shoe, as shown in Figure 2, consists of a channel-shaped member having a horizontally positioned wall 62 and vertically depending walls 63 which are arranged parallel with respect to each other. The vertically depending walls 63 of the channel-shaped shoe 52 are positioned adjacent the leg 61 of the T-shaped swivel member 50 and parallel thereto. Anti-friction bearing devices 64, comprising a plurality of rotary bearing elements, are positioned between the adjacent cooperating walls of the T-shaped swivel member 50 and the channel-shaped shoe member 52. The anti-friction bearing devices 64 are mounted upon the horizontal wall 62 of the shoe 52 by means of the pins 65 in such a manner that the bearing elements 64 engage opposite parallel sides of the vertically extending leg 61 of the T-shaped swivel 50 to thereby guide the shoe 52 longitudinally along the swivel 50 when the shoe is moved with respect to the swivel during operation thereof.

The shoe 52 is connected to a draw-bar 70 by means of a bolt 71. The bolt 71 is securely fastened within the horizontal wall 62 of the shoe 52 and extends upwardly through a hole 72 in the draw-bar 70. The upper end of the bolt 71 is threaded, upon which a nut 73 is positioned. Washer 74 and bushing 75 are provided on opposite sides of the draw-bar 70 so that when the nut 73 is tightened upon the bolt 71 the draw-bar 70 will be held between the washer 74 and the bushing 75 thereby pivotally securing the draw-bar 70 upon the shoe 52.

The draw-bar 70 is positioned horizontally above the slide 41 and parallel to the plane of the slide 41, but transversely to the slide. A guiding bracket 76 extends upwardly from the carriage bracket 40 is an integral extension thereof. A similar guide bracket 77 is positioned opposite the guide bracket 76 and is secured to the carriage bracket 40 by means of bolts 78. These guide brackets 76 and 77 are provided with transverse slots 79 and 80 respectively, in which the draw-bar 70 is positioned. A cover plate 81 is positioned above the draw-bar 70 and is bolted to the brackets 76 and 77 by means of the bolts 82. This cover plate in cooperation with the slots 79 and 80 form a guideway in which the draw-bar 70 may slide transversely with respect to the carriage bracket 40 and slide 41.

The draw-bar 70 extends beyond the carriage bracket 40 and into cooperative engagement with the cross-feed screw 28, see Figure 3, of the operating mechanism of the lathe. The end of the cross-feed screw 28 which extends through and beyond the cross-feed nut 29, secured to the cross slide 25, is provided with a reduced diameter portion 85 upon which a bearing 87 is positioned. At the ends of the bearing 87 there are provided thrust bearings 88 and 89 which are adapted to receive the transverse thrust transmitted between the draw-bar 70 and the cross-feed screw 28 during operation of the taper turning device. The bearing 87 and the thrust bearings 88 and 89 are retained upon the reduced diameter end portion of the cross-feed rod 28 by nut 90, which is in threaded engagement with the extreme end of the reduced diameter portion 85 of the cross-feed screw 28. A transverse flange 91 is provided upon the bearing 87 and engages the extending portion 92 of the draw-bar 70. The bolts 93 extend through the draw-bar 70 and the transverse flange 91 of the bearing 87 to rigidly secure the draw-bar 70 to the bearing 87 and thus to the cross-feed screw 28. The transverse movement of the draw-bar 70 created by relative movement of the various parts of the taper turning device is normally transmitted through the cross-feed screw 28. However, there are times when it is desirable that the draw-bar 70 be directly connected to the cross-slide 25, particularly when cutting extremely accurate tapers.

Under these conditions the draw-bar 70 is directly secured to the cross-slide 25 by means of the bolt 94 and the binding member 95. The bolt 94 threadedly engages the binding member 95 to draw the same tightly against the draw-bar 70 and thus binding the draw-bar to the cross-slide 25 whereby the transverse motion of the draw-bar 70 may be transmitted directly to the cross-slide 25.

Anti-friction bearings

The anti-friction bearing devices positioned between the adjacent walls of the movable members of the taper turning attachment consist of a plurality of individually disposed but lineally interconnected bearing elements. The bearing elements as disclosed in this invention consist of individually hardened steel balls which are interconnected by means of suitable interconnecting links, whereby a continuous chain of ball-bearing members is provided. This continuous chain of bearing members is interposed between the adjacent parallelly disposed cooperating working surfaces so as to provide a plurality of bearing surfaces having small area, thereby reducing the friction between the elements to a minimum. The chain of bearing elements is arranged and supported in such a manner that the chain can move longitudinally between the adjacent working surfaces as the surfaces are reciprocated to and fro.

In the form of the chain, as disclosed in Figures 2, 8, 12, 13 and 14, there is provided a plurality of hardened steel balls 100. A narrow cage member 101 encircles the ball circumferentially and is provided with a slight radial curve on the inner face thereof to engage the ball and retain the same within the cage, while at the same time permitting rotary movement of the ball within the cage. The cages 101 of adjacent ball members 100 are interconnected with suitable links 102, thereby creating a continuous chain of lineally interconnected rotary bearing elements. As more specifically disclosed in Figures 13 and 14, the interconnecting links 102 are shown as having a square cross-section. The cage 101 is provided with an extending portion 103 through which the link 102 may protrude. This extending portion 103 of the cage 101 has a square opening 104 therein through which the square interconnecting link protrudes.

The ends of the links 102 are formed with a head thereon after projecting the same through the cage extensions 103 to retain the link within the opening 104 and thus interconnect adjacent cage members 101 and their retaining bearing members 100. The square opening in the cage extension 103 is slightly larger than the square cross-section of the link 102, whereby a slight amount of axial movement will be permitted one cage with respect to the other without serious misalignment of the adjacent cages.

While the form of the interconnecting link and the manner of attaching the respective ball members adjacent each other is specifically disclosed with respect to Figures 13 and 14, yet the manner of securing adjacent ball members is not to be limited thereto. Other methods of attaching the respective ball members into a continuous chain of multiple rotary anti-friction bearing devices are shown in Figures 10, 11 and 16, and it is conceivable that many other methods of interconnecting the members could be produced.

Disclosed in Figures 10 and 11, the cage member 104 is provided with an extension 105 which is T-shaped. An adjacent cage 106 is provided with a channel-shaped end section 107 and is adapted to cooperate with the T-shaped end section 105 of the cage 104 so that a pin 108 extending therebetween will provide a pivot joint between the respective cage members. In Figure 16, another type of hinged pin joint is disclosed at 109 whereby the adjacent ball members are interconnected. This type of joint, however, permits movement of the chain at right angles to the plane of the cage, whereas the form as disclosed in Figure 10 will permit a movement of the chain in the same plane as the cage. These interconnected chains of rotary anti-friction bearing devices can be used as independently lineally disposed bearing surfaces, or they may be used as an endless chain of bearing surfaces to permit freedom of movement of the chain with respect to the adjacent bearing faces so that a greater movement of individual bearing elements is available due to creepage of the continuous chain between the bearing faces as the faces are moved relative to each other. This creepage of the endless chain would increase the life of the bearing members.

While the lineally interconnected rotary bearing elements are shown in this application as being continuous chains of bearing elements, it is conceivable that a single row of bearing elements could be used and suitable means could be provided for controlling the longitudinal movement of the individual chains, and while the preferred form of positions of the bearing elements has been shown as being between the slide and carriage bracket of the taper turning device, it is also conceivable that the same type of bearing could be interposed between adjacent working surfaces of the shoe and swivel.

*Incorporation of bearing chains into the device*

As disclosed in Figures 2 and 12, the anti-friction bearing devices 44 and 45 comprise a plurality of individually disposed but lineally interconnected rotary bearing elements 100. These bearing elements 100 are interconnected by the links 102 in such a manner that a continuous chain of bearing elements is provided. Passages 115 and 116 are provided in the carriage bracket 40 and are disposed in spaced parallel relation with the guideways 46 and 48 which guide, or form the races for, the anti-friction bearing devices 44 and 45, respectively. The passages 115 and 116 are disposed angularly from the vertical with respect to the guideways 46 and 48 for the bearing devices 44 and 45, respectively, whereby, the continuous chains of anti-friction bearing devices 44 and 45, are disposed angularly from the vertical since the chains 44 and 45 extend continuously between the longitudinal guideways 46 and 48 and return through the passageways 115 and 116 within the carriage bracket 40.

In order to retain the continuous chains of anti-friction bearing devices 44 and 45 in their proper positions with respect to the guideways 46 and 48 and the passages 115 and 116, respectively, a pulley 117 is provided adjacent each end of the carriage bracket 40. The pulley 117 is rotatably mounted upon a bearing 118 which in turn is suitably secured to the carriage bracket 40. The carriage bracket 40 has an enlarged cavity 119 at each end thereof into which passageway 116 terminates. This enlarged cavity 119 provides an area within which the pulley 117 may be mounted within the walls of the carriage bracket 40, while at the same time providing sufficient area to permit the chain 45 to be guided over the pulley 117 and be directed toward its entrance of the passageway 116. These pulleys 117 mounted adjacent the ends of the carriage bracket and the passageways 115 and 116, respectively, provide the means for tensioning the chains of anti-friction bearing devices 44 and 45 through the guideways 47 and 48 and the passageways 115 and 116 to prevent undue slack in the chain, and to permit free longitudinal movement of the chain with respect to the adjacent bearing surfaces when the slide 41 and carriage 40 are moved longitudinally with respect to each other.

These continuous chains of anti-friction bearing devices also tend to prevent vertical displacement of the slide 41 from the carriage bracket 40, since the radially curved races provided in the adjacent faces of the inserts 46 and 48 prevent vertical movement of the balls 100 between the adjacent working surfaces in the same manner as would the races of an ordinary ball-bearing type of bearing device prevent displacement of the balls from the races therein. These devices also, for this reason, provide a minimum of frictional resistance between the slide and carriage bracket regardless of whether the thrust upon the bearing chains 44 and 45 is vertical, transverse or angular.

In order to adjust the working clearance between the carriage bracket and slide, and their cooperating bearing chains 44 and 45, one of the inserts 46 in the carriage bracket 40 is provided with a tapered wall 125 which cooperates with a similarly tapered wall of the groove 126 in which the insert is positioned. A threaded screw member 127 threadedly engages a threaded opening 128 in the carriage bracket 40. The screw member 127 has an enlarged flanged portion upon the body thereof which engages the insert or gib 46. In order to adjust the clearances between the adjacent working surfaces of the slide 41, the carriage bracket 40 and the bearing chains 44 and 45 the threaded member 127 is rotated to cause movement of the insert or gib 46 with respect to the tapered wall of the groove 126 in the carriage bracket 40 so as to cause transverse movement of the cooperating surfaces and take up objectionable clearances.

In Figure 5, I have shown a modified arrangement whereby the slide 41 is prevented from vertical displacement from the carriage bracket 40. In this arrangement the slide 41 is provided with guideway inserts or gibs 130 and 131 which are positioned on the lower face of the slide 41 and are adapted to rest in a vertical position upon a continuous chain of anti-friction rotary bearing elements 132 and 133, which in turn rest in a vertical position upon guideway inserts 134 and 135 positioned in slots 136 and 137, respectively, in the carriage bracket 40. The continuous lineally interconnected chain of bearing elements 132 and 133 extend between their respective guideway inserts and return through the passageways 138 and 139. In this arrangement the vertical thrust of the slide 41 is taken by the bearing chains 132 and 133. To prevent vertical displacement of the slide 41 from the carriage bracket 40 an anti-friction bearing member 140 is provided, and comprises a plurality of rotary bearing elements retained by the axially movable race members. This anti-friction bearing device 140 is mounted upon a stud 141 which threadedly engages an extending mounting member 142. The mounting member is secured to the slide 41 by means of the bolt 143. The anti-friction bearing device 140 bears in a vertical direction against a horizontally positioned platform member 144 which is fastened to a boss 145, which extends upwardly from the carriage bracket 40, by means of the screw 146. By this construction the continuous chains of lineally interconnected bearing elements 132 and 133 are relieved of the function of preventing vertical displacement of the slide from the carriage bracket during operation of the taper turning device. A modified arrangement of this means for retaining the slide 41 from vertical displacement from the carriage bracket 40 is shown in Figure 4, and wherein the anti-friction bearing member 140 is mounted to the carriage bracket 40 rather than to the slide 41. This arrangement provides an inverted mechanical arrangement of the bearing elements.

In Figure 3, I have shown another mechanical arrangement for mounting the slide 41 upon the carriage bracket 40 with a plurality of continuous chains of lineally interconnected rotary bearing elements being positioned between the cooperating guideways of the slide and carriage bracket. In this arrangement, I provide channel-shaped insert members 150 and 151 positioned within parallelly positioned and longitudinally extending grooves 152 and 153, respectively, in the carriage bracket 40. The slide 41 has the inserts 154 and 155 positioned within longitudinally extending slots 156 and 157 in the opposite parallel walls of the slide 41. These inserts or gibs 154 and 155 extend beyond the parallel walls of the slide 41 and are provided with a substantially V-shaped cross-sectional area 158 and 159, respectively. The V-shaped areas 158 and 159 of the inserts or gibs 154 and 155 are adapted to cooperate with the channel-shaped walls of the inserts 150 and 151, respectively, whereby a guide means is provided for guiding the longitudinal movement of the slide 41 with respect to the carriage bracket 40.

A pair of chains of anti-friction bearing devices are positioned between the adjacent walls of the V-shaped cross-sectional area of the gib 154 and the channel walls of the insert 150 and comprise the chain 160 and a chain 161, each of which consists of a plurality of lineally interconnected rotary bearing elements. A similar set of chains 162 and 163 are positioned between the gib 155 and the insert 151. A passageway 164 is provided in the carriage bracket 40 to permit continuous return of the chains 160 and 161, while a passageway 165 is provided in the carriage bracket 40 for return of the chains 162 and 163. The chains 160 and 161 are tensioned between pulleys positioned adjacent the ends of the carriage bracket and their respective passageways in the bracket in the manner as heretofore described. In this arrangement, however, the pulley is a double track pulley, as shown at 167, see Fig. 9, each chain having its own track upon the pulley to follow.

In Figure 7, there is shown a modified arrangement of the positioning of the bearing chains with respect to the slide and carriage bracket from that disclosed in Figure 3, that is, the positioning of the guiding means between the carriage bracket and the slide have been inverted wherein the slide 41 is provided with a downwardly extending projection 170, which extends parallel to an upwardly extending guiding member 172 positioned upon the carriage bracket 40. The arrangement of a double set of bearing chains 162a and 163a between the gib 155a and the insert 153a is substantially the same as shown in Figure 3, except that in this arrangement, as shown in Figure 7, the transverse thrust of the slide 41 with respect to the carriage bracket 40 will be inwardly against the carriage bracket 40 rather than outwardly. Figure 8 shows a similar inversion of the bearing arrangement from that disclosed in Figure 2, wherein the carriage bracket 40 receives the transverse thrust inwardly from the slide 41.

As heretofore mentioned, the continuous chains of lineally interconnected rotary bearing elements could also be used between the shoe 52 and the swivel 50. An arrangement such as disclosed in Figure 17 can be provided wherein the swivel 50a is mounted upon the slide 41a by the pin 51a. The swivel 50a, in this arrangement is provided with vertically extending guideway walls 180 and 181. The shoe 52a is provided with vertically depending guideway walls 182 and 183 which are parallel to and adjacent the guideway walls 180 and 181 of the swivel 50a. A chain 184 of lineally interconnected rotary bearing elements is interposed between the cooperating faces 180 and 182 of the shoe 52a and the swivel 50a. A similar chain 185 of lineally interconnected rotary bearing elements is interposed between the cooperating walls 181 and 183 of the shoe 52a and the swivel 50a, respectively. An adjusting means comprising a tapered insert 186 may be positioned in the swivel 50a, which is moved by means of a threaded screw 187, said adjustment being similar to that disclosed in Figure 6. The shoe 52a is connected to a draw-bar in the same manner as has been described with respect to Figure 2 by means of the pin 71a.

*Operation*

The taper turning device of this invention may be connected or disconnected at will in order to permit the use of the lathe, either for turning straight pieces or for cutting tapers upon pieces, without removing the device from the lathe.

When using the lathe in such a manner as to turn a continuous longitudinal diameter upon a workpiece the bolt 202 in the anchor bracket 201 is loosened in order to permit the anchor bracket to slide longitudinally along the way 13 with the carriage 14. The bolt 210, which threadedly engages a boss 211 and extends through and in threaded engagement with the cover plate 82, is tightened so that the end of the bolt 210 binds upon the draw-bar 70 to prevent transverse movement of the draw-bar with respect to the axis of rotation of a workpiece positioned in the lathe. Since the draw-bar 70 is now secured from transverse movement, and since the draw-bar is secured to the cross-feed screw 28 through means of the bearing 87, the cross-feed screw 28 may be rotated through means of the lathe driving mechanism (not shown) to transversely move the cross-slide 25 with respect to the lathe bed 12. The transverse thrust of the cross-feed screw 28 is taken by the bearings 88 and 89 positioned at the end of the cross-feed screw 28.

When it is desired to cut a longitudinal taper upon a workpiece the bolt 202 of the anchor bracket 201 is tightened to secure the anchor bracket rigidly to the way 13 of the lathe bed, thereby preventing longitudinal movement of the slide when the carriage 14 and carriage bracket 40 are moved longitudinally upon the ways of the lathe bed. The bolt 210 is loosened to permit the draw-bar 70 to slide transversely within the guideways provided in the brackets 76 and 77. The swivel 50 is positioned at the proper angle, according to the taper desired to be cut upon the workpiece, and the clamping screws 57 are tightened to retain the swivel 50 in its angular position upon the slide 41. Longitudinal movement of the carriage 14, when driven by the feed rod (not shown) of the lathe, will also cause longitudinal movement of the carriage bracket 40 secured to the carriage 14. Since the shoe 52 is secured to the draw-bar 70, which in turn is guided by the brackets 76 and 77 secured to the carriage bracket 40, the shoe 52 will be carried in an angular direction within the swivel 50 while being moved longitudinally. As shown in Figure 1, the swivel is set to cut a taper of increasing diameter as the carriage 14 is moved longitudinally to the left upon the lathe. Under the conditions for cutting a taper upon a workpiece the cross-feed screw 28 is not connected with the driving mechanism of the lathe, serving the function only of transmitting transverse motion from the draw-bar 70 to the cross-slide 25. These circumstances require that the cross-feed screw 28 have a telescopic driving attachment with the lathe driving mechanism to permit the transverse movement of the cross-feed screw without rotation thereof.

While the taper cutting apparatus is functioning as a taper cutting device the anchor bracket 201 will retain the slide 41 from longitudinal movement with respect to the lathe 10. The carriage bracket 40, secured to the carriage 14, will be moved longitudinally upon the lathe bed 12 whereby longitudinal movement between the carriage bracket 40 and the slide 41 is created. The anti-friction bearings 44 and 45 positioned between the cooperating guideways 46 and 48 between the carriage bracket 40 and the carriage 41 assume the friction of the movement between the carriage bracket 40 and the slide 41. Since the shoe 52 is moving upon the swivel 50 in an angular direction with respect to the axis of rotation of the workpiece positioned in the lathe, considerable transverse thrust is transmitted through the shoe 52 and the swivel 50 to the slide 41. This transverse thrust is thereby transmitted by the slide 41 to anti-friction bearing devices provided between the slide 41 and the carriage bracket 40. The continuous chain type of anti-friction bearing device, as disclosed in this invention, can move longitudinally between the slide 41 and the carriage bracket 40 when the slide and carriage bracket are moved longitudinally with respect to each other whereby a rolling bearing action is accomplished by the rotary bearing elements 100 of the anti-friction bearing devices 44 and 45.

There is also a transverse thrust assumed by the anti-friction bearing device 64 positioned between the shoe 52 and the guideway 61 of the swivel 50. This thrust is the same as that which is assumed between the slide 41 and the carriage bracket 40. Since the transverse movement transmitted by the draw-bar 70, created from the movement of the shoe 52, to the carriage 14 of the lathe is a directly transmitted push or pull upon the cross-slide 25, it is seen that the thrust created between the shoe 52 and the swivel 50 and between the slide 41 and the carriage bracket 40 increases rapidly as the angle of the swivel 50 is increased and can become so great as to prevent the necessary sliding action between the elements of the taper cutting device. It is thus necessary that the anti-friction device positioned between the various cooperating guiding members be of a type to reduce this friction to a minimum and permit free movement between the moving members of the taper cutting device in order to transmit an accurate taper cut to the workpiece positioned in the lathe.

The necessity for reducing friction between the various movable members of the taper turning device is essential, not only between the carriage bracket and the slide, but also between the shoe and swivel. Since the movement of the shoe 52 upon the guideway 61 of the swivel 50 is the means by which transverse motion is transmitted to the cross-slide of the lathe, it is seen that the movable surfaces between the shoe and the swivel will carry just as much friction as the slide and carriage bracket. The accuracy of the taper turning device depends upon absolute free movement of the various elements and, as a result, the use of the anti-friction bearings, of the continuous chain type, heretofore described are of particular advantage when used between the shoe and the swivel. The transverse thrust caused by the draw-bar and movement of the shoe with respect to the swivel will be absorbed by the anti-friction bearings interposed between the shoe 52 and the guideway 61 of the swivel 50, thereby retaining the taper cutting device to a maximum degree of accuracy. The anti-friction bearings used between the shoe and the swivel have been more particularly described with regard to Figure 17.

While the form of taper cutting device heretofore described is a preferred form, it is to be understood that other forms of a taper cutting attachment may be arranged to use the same type of anti-friction bearings heretofore described with respect the preferred form. As an example, the carriage bracket and slide could be reversed in position with respect to movement with regard the lathe, that is, the carriage bracket rather than being mounted upon the lathe carriage and moving therewith, could be stationarily mounted upon the bed of the lathe and the slide, in this instance, would move with the lathe carriage. In this instance the carriage bracket could be mounted upon a dovetail positioned upon the bed of the lathe and could be adjustable longitudinally along the lathe bed and be clamped in any desired position along the bed. The work tool would be mounted in the tool slide of the lathe carriage, and would be connected to the taper attachment swivel by means of the connecting bar, or draw-bar, in the usual manner.

It is to be understood that the use of the lineally interconnected rotary bearing elements is not limited to the particular type of apparatus disclosed in this application, but can be used between any movable surfaces where friction is to be reduced to a minimum.

While the form and embodiment as disclosed in this application show a preferred form yet it is desirable that the application be not limited thereby, but shall cover the apparatus falling within the scope of the claims.

Having thus fully described my invention, what I claim as new and desire to secure by Letters Patent, is:

1. In a machine tool, a carriage bracket, a slide member movable with respect to said carriage bracket, means carried upon said slide member for transmitting an angular power movement when said slide and said carriage are moved relative to each other, a passageway in said carriage bracket, a continuous chain of lineally interconnected anti-friction bearing devices interposed between said carriage bracket and said slide, said chain extending continuously through said passageway and between said carriage bracket and said slide.

2. In a machine tool, a carriage bracket, a slide member movable with respect to said carriage bracket, means carried upon said slide member for transmitting an angular power movement when said slide and said carriage are moved relative to each other, a guideway positioned in said carriage bracket, a cooperating guideway positioned in said slide, a passageway in said carriage bracket, said passageway being in spaced parallel relationship with said guideways, a continuous chain of lineally interconnected anti-friction bearing devices interposed between said guideways, said chain extending continuously through said passageway and between said guideways.

3. In a machine tool, a carriage bracket, a slide member movable with respect to said carriage bracket, means carried upon said slide member for transmitting an angular power movement when said slide and said carriage are moved relative to each other, a passageway in said carriage bracket, a continuous chain of lineally interconnected anti-friction bearing devices interposed between said carriage bracket and said slide, said chain extending continuously through said passageway and between said carriage bracket and said slide, and means positioned adjacent each end of said carriage bracket for tensioning said chain therebetween.

4. In a machine tool, a carriage bracket, a slide member movable with respect to said carriage bracket, means carried upon said slide member for transmitting an angular power movement when said slide and said carriage are moved relative to each other, a guideway positioned in said carriage bracket, a cooperating guideway positioned in said slide, a passageway in said carriage bracket, said passageway being in spaced parallel relationship with said guideways and disposed angularly from vertical with respect thereto, a continuous chain of lineally interconnected anti-friction bearing devices interposed between said guideways, said chain extending continuously through said passageway and between said guideways and being disposed in a plane angular from vertical, and means positioned adjacent each end of said carriage bracket for tensioning said chain therebetween, said means being disposed in the same angular plane as said chain.

5. In a machine tool, a carriage bracket, a slide member movable longitudinally with respect to said carriage bracket, means carried upon said slide member for transmitting a power movement angular to the longitudinal movement between said slide and said carriage bracket simultaneously with occurrence of longitudinal movement between said members, a plurality of lineally interconnected anti-friction bearing devices interposed between said carriage bracket and said slide, said devices providing a multiplicity of longitudinally movable anti-friction bearing surfaces which assume the transverse thrust of said slide when said slide is moved relative to said carriage bracket.

6. In a machine tool, a carriage bracket, a slide member movable longitudinally with respect to said carriage bracket, means carried upon said slide member for transmitting a power movement angular to the longitudinal movement between said slide and said carriage bracket simultaneously with occurrence of longitudinal movement between said members, a passageway in said carriage bracket, a continuous chain of lineally interconnected rotary bearing elements interposed between said carriage and said slide, said chain extending continuously through said passageway and between said carriage bracket and said slide and providing an evenly distributed multiplicity of longitudinally movable anti-friction bearing surfaces which assume the transverse thrust of said slide when said slide is moved relative to said carriage bracket.

7. In a machine tool, a carriage bracket, a slide member movable longitudinally with respect to said carriage bracket, means carried upon said slide member for transmitting a power movement angular to the longitudinal movement between said slide and said carriage bracket simultaneously with occurrence of longitudinal movement between said members, a passageway in said carriage bracket, a continuous chain of lineally interconnected rotary bearing elements interposed between said carriage and said slide, said chain extending continuously through said passageway and between said carriage bracket and said slide, means positioned adjacent each end of said carriage bracket for tensioning said chain therebetween, said chain being reciprocable over said tensioning means, through said passageway and between said slide and carriage bracket when said last mentioned elements are reciprocated relative to each other.

8. In a machine tool, a carriage bracket having longitudinally disposed parallel guides, a slide member cooperating with said guides, means carried upon said slide member for transmitting a power movement angular to the longitudinal movement between said slide and said carriage bracket simultaneously with occurrence of longitudinal movement between said members, and a continuous chain of lineally interconnected rotary bearing elements interposed between said carriage bracket guides and said slide.

9. In a machine tool, a carriage bracket having a longitudinally disposed recess with vertical walls, a slide cooperating with said recess walls and guided thereby in its longitudinal movement, means carried upon said slide member for transmitting a power movement angular to the longitudinal movement between said slide and said carriage bracket simultaneously with occurrence of longitudinal movement between said members, and a continuous chain of lineally interconnected rotary bearing elements interposed between a wall of said recess and the cooperating wall of said slide.

10. In a machine tool, a carriage bracket having a longitudinally disposed recess with vertical walls, a slide cooperating with said recess walls and guided thereby in its longitudinal movement, means carried upon said slide member for transmitting a power movement angular to the longitudinal movement between said slide and said carriage bracket simultaneously with occurrence of longitudinal movement between said members, a continuous chain of lineally interconnected rotary bearing elements interposed between a wall of said recess and the cooperating wall of said slide, said chain assuming the transverse thrust of said slide due to relative movement between said slide and said carriage bracket and transmitting said thrust outwardly against the recess wall in said carriage bracket.

11. In a machine tool, a carriage bracket having upwardly extending longitudinally positioned guideways, a slide member having a channel shaped recess with vertical walls in the bottom face thereof, said guideways and said channel walls providing means to longitudinally guide said slide upon said carriage bracket, means carried upon said slide member for transmitting a power movement angular to the longitudinal movement between said slide and said carriage bracket simultaneously with occurrence of longitudinal movement between said members, continuous chains of lineally interconnected rotary bearing elements interposed between said guideways and said recess walls, said chains assuming the transverse thrust of said slide due to relative movement between said slide and said carriage bracket and transmitting said thrust inwardly against the guideways on said carriage bracket.

12. In a machine tool, a carriage bracket having upwardly extending longitudinally positioned guideways, a slide member having walls parallel to and adjacent said guideways, said guideways and said walls providing means to longitudinally guide said slide upon said carriage bracket, means carried upon said slide member for transmitting a power movement angular to the longitudinal movement between said slide and said carriage bracket simultaneously with occurrence of longitudinal movement between said members, continuous chains of lineally interconnected rotary bearing elements interposed between said guideways and said walls, said chains assuming the transverse thrust of said slide due to relative movement between said slide and said carriage bracket and transmitting said thrust inwardly against the guideways on said carriage bracket.

13. In a machine tool, a carriage bracket having upwardly extending longitudinally positioned guideways, a slide member having walls parallel to and adjacent said guideways, said guideways and said walls providing means to longitudinally guide said slide upon said carriage bracket, means carried upon said slide member for transmitting a power movement angular to the longitudinal movement between said slide and said carriage bracket simultaneously with occurrence of longitudinal movement between said members, continuous chains of lineally interconnected rotary bearing elements interposed between said guideways and said walls, and means for adjusting the position of one of the guiding walls with respect to the remaining walls to accurately adjust the clearances between said walls and said bearing chains.

14. In a machine tool, a carriage bracket having upwardly extending longitudinally positioned guideways, a slide member having walls parallel to and adjacent said guideways, said guideways and said walls providing means to longitudinally guide said slide upon said carriage bracket, means carried upon said slide member for transmitting a power movement angular to the longitudinal movement between said slide and said carriage bracket simultaneously with occurrence of longitudinal movement between said members, continuous chains of lineally interconnected rotary bearing elements interposed between said guideways and said walls, and an anti-friction bearing device comprising multiple rotary bearing elements positioned to prevent vertical removal of said slide from said carriage bracket.

15. In a machine tool, a carriage bracket having upwardly extending longitudinally positioned guideways, a slide member having walls parallel to and adjacent said guideways, said guideways and said walls providing means to longitudinally guide said slide upon said carriage bracket, means carried upon said slide member for transmitting a power movement angular to the longitudinal movement between said slide and said carriage bracket simultaneously with occurrence of longitudinal movement between said members, continuous chains interposed between said guideways and said walls, said chains preventing vertical removal of said slide from said carriage bracket.

16. In a machine tool, a carriage bracket having upwardly extending longitudinally positioned guideways, a substantially channel-shaped recess in said guideways, a slide member having walls parallel to and adjacent said guideways, said walls having substantially V-shaped extensions for extending into and cooperating with the walls of said channel-shaped recesses to provide guideway means for said slide, means carried upon said slide member for transmitting a power movement angular to the longitudinal movement between said slide and said carriage bracket simultaneously with occurrence of longitudinal movement between said members, and a continuous chain of lineally interconnected rotary bearing elements interposed between each pair of adjacent parallel walls of said guideway means.

17. In a machine tool, a carriage bracket having upwardly extending longitudinally positioned guideways, a substantially channel-shaped recess in said guideways, a slide member having walls parallel to and adjacent said guideways, said walls having substantially V-shaped extensions for extending into and cooperating with the walls of said channel-shaped recesses to provide guideway means for said slide, means carried upon said slide member for transmitting a power movement angular to the longitudinal movement between said slide and said carriage bracket simultaneously with occurrence of longitudinal movement between said members, a continuous chain of lineally interconnected rotary bearing elements interposed between each pair of adjacent parallel walls of said guideway means means positioned adjacent each end of said carriage bracket for tensioning said chains therebetween, said means positioning said chains in continuous parallel relationship.

18. In a machine tool, a carriage bracket, a slide member movable with respect to said carriage bracket, a guide member pivotally supported upon said slide and adapted to be positioned angularly with respect to movement between said slide and said carriage bracket, a follower engaging said guide, said carriage bracket being adapted to engage a source of power to cause relative movement between said bracket and said slide, means engaging said follower and said carriage bracket through which angular movement of said follower is transmitted, and a plurality of lineally interconnected anti-friction bearing devices interposed between said carriage bracket and said slide.

19. In a machine tool, a carriage bracket, a slide member movable with respect to said carriage bracket, a guide member pivotally supported upon said slide and adapted to be positioned angularly with respect to movement between said slide and said carriage bracket, a follower engaging said guide, said carriage bracket being adapted to engage a source of power to cause relative movement between said bracket and said slide, means engaging said follower and said carriage bracket through which angular movement of said follower is transmitted, and a continuous chain of lineally interconnected rotary bearing elements interposed between said carriage and said slide.

20. In a machine tool, a carriage bracket, a slide member movable with respect to said carriage bracket, a guide member pivotally supported upon said slide and adapted to be positioned angularly with respect to movement between said slide and said carriage bracket, a follower engaging said guide, said carriage bracket being adapted to engage a source of power to cause relative movement between said bracket and said slide, means engaging said follower and said carriage bracket through which angular movement of said follower is transmitted, and a continuous chain of lineally interconnected rotary bearing elements interposed between said carriage and said slide, a passageway in said carriage bracket, said chain extending continuously through said passageway and between said carriage bracket and said slide, and means positioned adjacent each end of said carriage bracket for tensioning said chain therebetween.

21. In a machine tool, means for rotating a workpiece, a longitudinally movable carriage, a cutting tool associated with said carriage and moved relative to the workpiece by the carriage, a guiding member, a following member engaging said guiding member, means interconnecting said following member with said cutting tool, a carriage bracket, a slide associated with said carriage bracket and longitudinally movable with respect thereto, said guiding member being pivotally mounted upon said slide to permit angular displacement of said guiding member with respect to the axis of rotation of the workpiece, said carriage and said carriage bracket being associated and movement thereof being parallel to the axis of rotation of the workpiece, and a plurality of lineally interconnected anti-friction bearing devices interposed between said carriage bracket and said slide to assume the transverse thrust caused by the movement of the follower in the angularly displaced guiding member.

22. In a machine tool, means for rotating a workpiece, a longitudinally movable carriage, a cutting tool associated with said carriage and moved relative to the workpiece by the carriage, a guiding member, a following member engaging said guiding member, means interconnecting said following member with said cutting tool, a carriage bracket, a slide associated with said carriage bracket and longitudinally movable with respect thereto, said guiding member being pivotally mounted up said slide to permit angular displacement of said guiding member with respect to the axis of rotation of the workpiece, said carriage and said carriage bracket being associated and movement thereof being parallel to the axis of rotation of the workpiece, and a continuous chain of lineally interconnected rotary bearing elements interposed between said carriage and said slide to assume the transverse thrust caused by the movement of the follower in the angularly displaced guiding member.

23. In a machine tool, means for rotating a workpiece, a longitudinally movable carriage, a cutting tool associated with said carriage and moved relative to the workpiece by the carriage, a guiding member, a following member engaging said guiding member, means interconnecting said following member with said cutting tool, a carriage bracket, a slide associated with said carriage bracket and longitudinally movable with respect thereto, said guiding member being pivotally mounted upon said slide to permit angular displacement of said guiding member with respect to the axis of rotation of the workpiece, said carriage and said carriage bracket being associated and movement thereof being parallel to the axis of rotation of the workpiece, a continuous chain of lineally interconnected rotary bearing elements interposed between said carriage and said slide, a passageway in said carriage bracket, said chain extending continuously through said passageway and between said carriage bracket and said slide, and means positioned adjacent each end of said carriage bracket for tensioning said chain therebetween.

24. An anti-friction bearing device comprising a plurality of balls, each ball having a narrow cage around the circumference thereof, square apertures in said cage positioned diametrically opposite each other, a square pin extending through the apertures of adjacent cages and retained in said cage apertures, said pins having a slightly less cross-section than said apertures to permit slight axial rotation of said balls.

25. In a machine tool, a carriage bracket, a slide member movable with respect to said carriage bracket, means carried upon said slide member for transmitting an angular power movement when said slide and said carriage are moved relative to each other, a guideway positioned in said carriage bracket, a cooperating guideway positioned in said slide, a plurality of lineally interconnected anti-friction bearing devices interposed between said carriage bracket and said slide, and means to adjust the working clearance between said guideways and said anti-friction bearing devices.

26. In a machine tool, a carriage bracket, a slide member movable with respect to said carriage bracket, means carried upon said slide member for transmitting an angular power movement when said slide and said carriage are moved relative to each other, a continuous chain of lineally interconnected rotary bearing elements interposed between said carriage and said slide, and means to adjust the working clearance between cooperating guide walls of said slide and carriage bracket and said chain.

CLIFFORD A. BICKEL.